United States Patent [19]

Kobayashi et al.

[11] Patent Number: 6,119,978
[45] Date of Patent: Sep. 19, 2000

[54] LEADING EDGE STRUCTURE OF AIRCRAFT AIRFOIL AND METHOD OF FABRICATING THE SAME

[75] Inventors: Takashi Kobayashi; Michihiko Banno; Kazuaki Amaoka, all of Utsunomiya, Japan

[73] Assignee: Fuji Jukogyo Kabushiki Kaisha, Tokyo, Japan

[21] Appl. No.: 09/118,870

[22] Filed: Jul. 20, 1998

[30] Foreign Application Priority Data

Jul. 24, 1997 [JP] Japan .................................. 9-198584

[51] Int. Cl.[7] ...................................................... B64C 3/00
[52] U.S. Cl. ...................... 244/35 R; 244/204; 244/134 R
[58] Field of Search .................. 244/35 R, 204, 244/134 R, 134 B, 123, 207, 134 C

[56] References Cited

U.S. PATENT DOCUMENTS 4,738,416  4/1988  Birbagher .............................. 244/134 B
5,011,098  4/1991  McLaren et al. ...................... 244/134 B

FOREIGN PATENT DOCUMENTS

97/13683  4/1997  France .................................... 244/135
9-071298  3/1997  Japan ..................................... 244/135
9-71298   3/1997  Japan .

*Primary Examiner*—Peter M. Poon
*Assistant Examiner*—Judith A. Nelson
*Attorney, Agent, or Firm*—Smith, Gambrell & Russell, LLP

[57] ABSTRACT

A leading edge structure of an aircraft airfoil including an outer skin, a front wall extended in the spanwise direction of the leading edge structure in a front section of the space defined by the outer skin so as to form an anti-icing duct together with a front part of the outer skin, and a plurality of ribs disposed in the space defined by the outer skin so as to form hot air passages. A laminar structure is formed by superposing upper and lower sheets of a superplastic titanium alloy, inserting a pair of core sheets of a superplastic titanium alloy between the upper and the lower sheet, and forming release agent layers in predetermined regions between the sheets. A structure having at least the outer skin, the front wall and ribs is formed by joining together parts of the super-posed sheets corresponding to regions not coated with the release agent layers by diffusion bonding or welding, heating the laminar structure in a forming mold, supplying a superplastic forming gas into spaces between parts of the superposed sheets corresponding to regions coated with the release agent layers to subject the same parts of the superposed sheets to superplastic deformation and to press the upper sheet and the lower sheet against the forming surface of the forming mold.

7 Claims, 10 Drawing Sheets

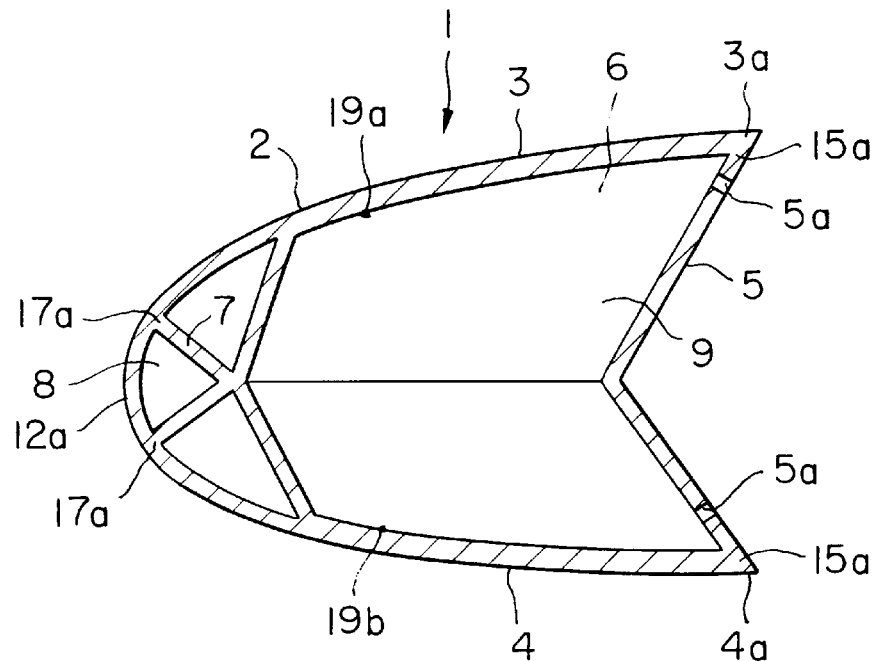
F I G. 2
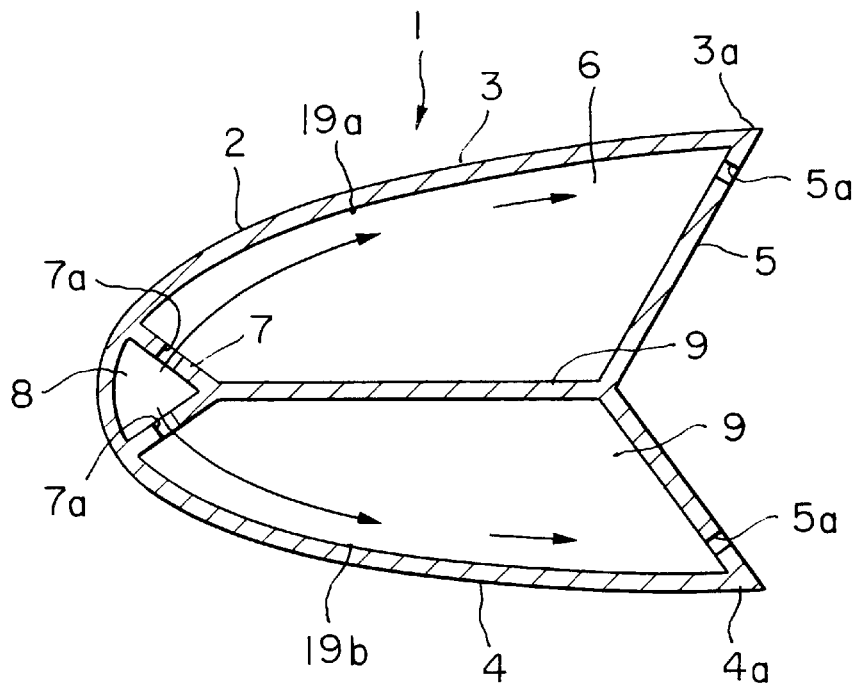
F I G. 3

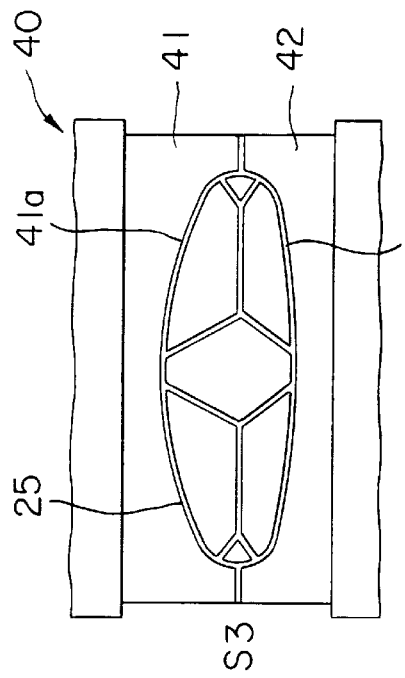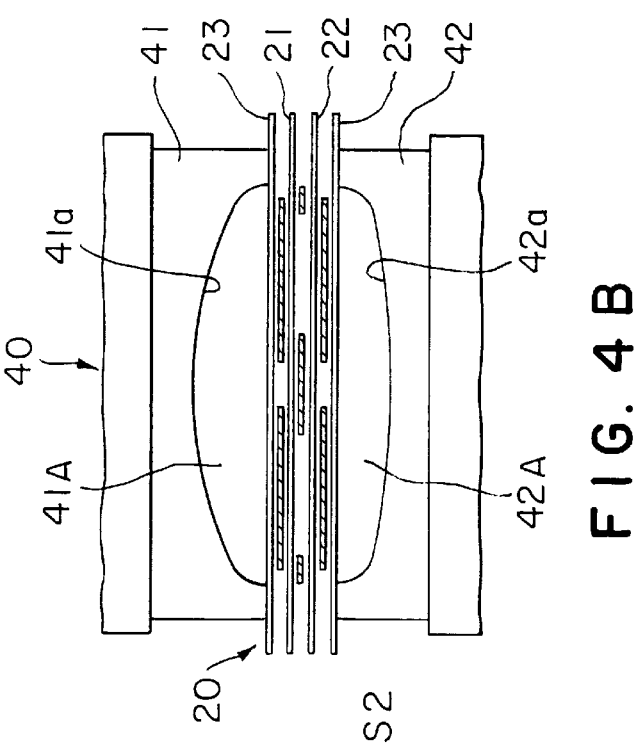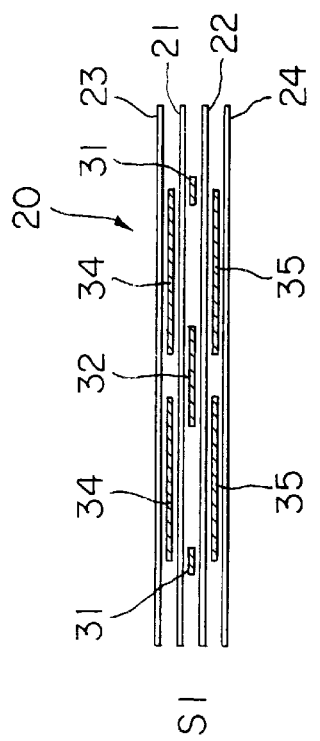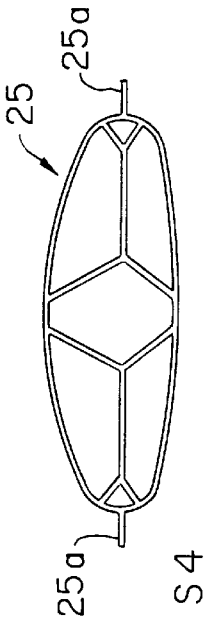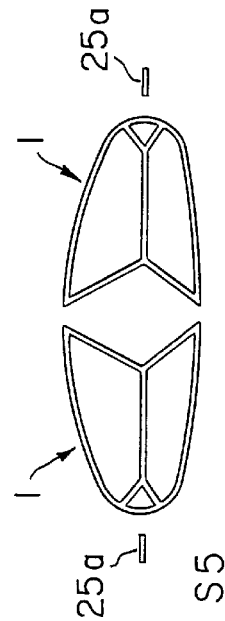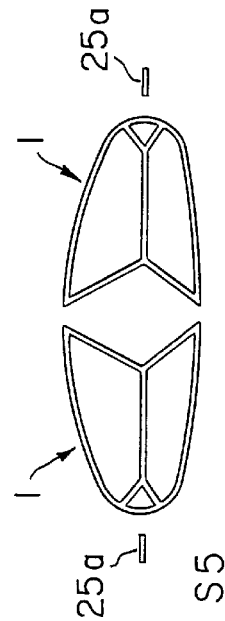

LEADING EDGE STRUCTURE OF AIRCRAFT AIRFOIL AND METHOD OF FABRICATING THE SAME

BACKGROUND OF THE INVENTION

1. Field of the Invention

The present invention relates to a leading edge structure for an airfoil such as a main wing, a horizontal stabilizer, a vertical fin, an elevator or a rudder of an aircraft, and a method of fabricating such a leading edge structure. More particularly, the present invention relates to a leading edge structure for an aircraft, integrally formed with a hot air passage of an anti-icing system, and a method of fabricating the leading edge structure.

2. Description of the Related Art

The leading edge structure of an airfoil such as a main wing, a horizontal stabilizer, a vertical fin, an elevator or a rudder of an aircraft must have an anti-icing system to prevent the ice formation on the leading edge structure. The anti-icing system supplies hot air extracted from an engine compressor into the interior space of the leading edge structure covered by an outer skin so as to flow along the inner surface of the outer skin to raise the surface temperature of the outer skin and to prevent the ice formation on the outer surface of the leading edge structure.

Such a leading edge structure is disclosed in JP-A-9-71298. Referring to FIG. 7 showing the prior art leading edge structure 100 for an aircraft disclosed in JP-A-9-71298 in a partially cutaway perspective view, an inner skin 102 of a fiber-reinforced plastic and a front wall 103 are disposed on the inner side of an outer skin 101 of a fiber-reinforced plastic. The outer skin 101, the inner skin 102 and the front wall 103 are united by bonding to define a heating chamber 104 in the leading edge structure 100. A rear wall 105 is disposed behind the front wall 103 to define a hot air discharge chamber 106 between the front wall 103 and the rear wall 105. The heating chamber 104 is partitioned by the front wall 103 into a hot air jetting section 104a on the front side and a hot air passage section 104b on the rear side. An anti-icing duct 108 provided with a plurality of air jetting holes 108a is extended in the hot air jetting section 104a. Hot air flows through the anti-icing duct 108. Hot air ejected through the hot air jetting holes 108a of the anti-icing duct 108 flows from the hot air jetting section 104a into the hot air passage section 104b, flows along hot air passages 104c formed in the hot air passage section 140b into the hot air discharge chamber 106, and is discharged through a discharge hole formed in the tip of the wing into the atmosphere. The formation of ice on the leading edge structure 100 is prevented by thus making the hot air flow along the inner surface of the outer skin 101 of the leading edge structure 100.

A method of fabricating this prior art leading edge structure 100 will be described hereafter. As shown in FIG. 8A, an outer skin prepreg sheet 112 for forming the outer skin 101 is placed on a shaping surface of a leading edge skin mold 111 having a shape corresponding to the external shape of the outer skin 101. A comb-shaped silicone block 113 is placed as shown in FIG. 8B on the inner surface of the outer skin prepreg sheet 112 before hardening. An inner skin prepreg sheet 114 for forming the inner skin 102 is placed on the silicone block 113 so that parts thereof are forced into spaces between adjacent teeth to form straightening fins defining the hot air passages 104c. The leading edge skin mold 111 holding the outer skin prepreg sheet 112, the silicone block 113 and the inner skin prepreg sheet 114 is placed in a vacuum bag, and the vacuum bag is evacuated, the outer skin prepreg sheet 112 and the inner skin prepreg sheet 114 are heated and compressed to unite the outer skin prepreg sheet 112 and the inner skin prepreg sheet 114 by bonding the straightening fins of the inner skin prepreg sheet 114 to the outer skin prepreg sheet 112. Subsequently, the silicone block 113 is removed, the front wall 103 formed by a separate process is joined to the assembly of the outer skin prepreg sheet 112 and the inner skin prepreg sheet 114 (FIG. 8C), and the anti-icing duct 108 is attached to the front wall 103 to complete the leading edge structure 100.

Aluminum alloys have been used as materials for forming the leading edge structures of aircrafts because each of aluminum alloys has a small specific gravity and a high strength. FIG. 9 is a perspective view of an aluminum alloy leading edge structure 120, FIG. 10 is a sectional view taken on line X—X in FIG. 9, and FIG. 11 is a sectional view taken on line X1—X1 in FIG. 9. The aluminum alloy leading edge structure 120 will be described with reference to FIGS. 9, 10 and 11. An inner skin 122 formed by bending a corrugated sheet is extended along the inner surface of an outer skin 121 to form a hot air passage 123 extending along the inner surface of the outer skin 121 structure. A hot air outlet opening 122a is formed in a part of the inner skin 122 corresponding to the front edge of the leading edge structure 120. A plurality of ribs 124 are attached to the inner skin 124 to divide a space defined by the inner skin 122 into a plurality of sections. A front wall 125 are attached to the rear edges of the inner skin 124. Each rib 124 is provided with an opening 124a. An anti-icing duct 127 is extended through the openings 124a of the ribs 124, and the anti-icing duct 127 is fastened to the ribs 124 by clips 128 formed by bending a sheet. As shown in FIG. 12 in a perspective view, the anti-icing duct 127 is provided with a plurality of air outlet openings 127a.

Hot air of a high temperature supplied into the anti-icing duct 127 is jetted through the air outlet openings 127a into the space defined by the inner skin 122 and the front wall 125. Then, the hot bleed air flows through the hot air outlet opening 122a formed in the inner skin 122 into the space between the outer skin 121 and the inner skin 122, flows through the same space along the inner surface of the outer skin 121 and is discharged through a discharge hole formed in the tip of the wing into the atmosphere. The hot air that flows along the inner surface of the outer skin structure 121 raises the surface temperature of the outer skin 121 to prevent the formation of ice on the surface of the leading edge structure 120.

The outer skin 121, the inner skin 122 and the rib 124 of the leading edge structure 120 are built by forming aluminum alloy sheets by press forming or roll forming, and finished by shaping the external shape by trimming. The clips 128 for fastening the anti-icing duct 127 to the ribs 124 are formed by bending an aluminum alloy sheet. The anti-icing duct 127 is formed by bending a tube of a titanium alloy or a stainless steel, and forming the plurality of air outlet openings 127a in the tube. The leading edge structure 120 is constructed by positioning these components of the leading edge structure 120 relative to each other by using jigs and adjusting shims, forming holes for receiving fasteners in the components, and fastening together the components with fastening means, such as rivets and clips.

When fabricating the former prior art leading edge structure 100, the leading edge structure is formed by bonding together and hardening the outer skin 101 of a fiber-reinforced plastic, the inner skin 102 of a fiber-reinforced plastic, and the front wall 103. Therefore, firm joints are formed between the outer skin 101 and the inner skin 102 by its own adhesive strength of the outer skin 101 and the inner skin 102. However, since only the front wall 103 and the rear wall 105 spaced from the front wall 103 are extended between the upper and the lower section of the outer skin of the leading edge structure, there is the possibility that the leading edge structure 100 cannot be formed in a required strength. Furthermore, fabrication of the leading edge structure 100 needs many processes and troublesome work because the leading edge structure 100 is fabricated by placing the outer skin prepreg sheet 112 for forming the outer skin 101 on the shaping surface of the leading edge skin mold 111 having a shape corresponding to the external shape of the outer skin 101, placing the comb-shaped silicone block 113 on the inner surface of the outer skin prepreg sheet 112, placing the inner skin prepreg sheet 114 for forming the inner skin 102 on the silicone block 113, placing the leading edge skin tool mold 111 holding the outer skin prepreg sheet 112, the silicone block 113 and the inner skin prepreg sheet 114 in the vacuum bag, evacuating the vacuum bag, heating and compressing the outer skin prepreg sheet 112 and the inner skin prepreg sheet 114 to unite and harden the outer skin prepreg sheet 112 and the inner skin prepreg sheet 114, removing the silicone block 113, joining the front wall 103 formed by a separate process to the assembly of the outer skin prepreg sheet 112 and the inner skin prepreg sheet 114, and attaching the anti-icing duct 108 to the front wall 103.

The outer skin 121, the inner skin structure, the plurality of ribs 124, the anti-icing duct 127 and the plurality of clips 128 respectively having different shapes need to be assembled when fabricating the latter prior art leading edge structure 120. Those components need to be formed in high accuracy and need expensive jigs to position the same correctly relative to each other, and the leading edge structure must be formed in an accurate external shape meeting severe aerodynamic requirements. The relative positions of the components must be adjusted by using shims, and much labor is required for forming the holes in the components and fastening together the components with fasteners, such as rivets, inserted in the holes. Furthermore, the dependence of strength only on load transfer through the joints is undesirable fin respect of the efficiency of load transfer between the components, fastening the anti-icing duct to the ribs 124 by the clips 127 in an narrow space in the leading edge structure requires difficult work and a great deal of skill, and increases assembling costs.

Since the anti-icing duct 127 must be heat-resistant, the same is made of a titanium alloy or a stainless steel. The titanium alloy of the stainless steel are hard to work and hence the formation of the air outlet openings 127a in the anti-icing duct 127 needs the frequent changes of boring tools, troublesome work and much labor.

SUMMARY OF THE INVENTION

Accordingly, it is an object of the present invention to provide a leading edge structure of an aircraft airfoil having a high strength, requiring simple jigs, simple machining and simple assembling work for fabrication, and capable of being fabricated at greatly reduced manufacturing costs.

Another object of the present invention is to provide a method of fabricating such a leading edge structure.

According to a first aspect of the present invention, a leading edge structure of an airfoil comprises: an outer skin continuously and integrally formed of upper and lower sections; a front wall extending in a spanwise direction of the leading edge structure in a front section of the outer skin; an air hole provided through the front wall; a plurality of ribs disposed between the upper and lower sections of the outer skin so as to form a hot air passage for a hot air supplied through the air hole of the front wall. The outer skin, the front wall and the ribs are made of a superplastic alloy, and are formed by superplastic forming.

The anti-icing duct is formed by closing a front part of the inner space of the leading edge structure, the hot air passages are formed by partitioning the inner space between the upper and the lower section of the outer skin by the ribs, and the outer skin, the front wall and the ribs may be formed by constructing the laminar structure by superposing the sheets of a superplastic titanium alloy and bonding together the predetermined parts of the sheets by diffusion bonding or welding, and subjecting the laminar structure to superplastic forming. Therefore the leading edge structure has a high strength, work for mounting an anti-icing duct on the front wall can be omitted, and assembling work is simplified.

A method of fabricating a leading edge structure of an airfoil according to a second aspect of the present invention comprises: a superposing step for forming a laminar structure by superposing a superplastic alloy upper sheet and a superplastic alloy lower sheet, inserting a pair of superplastic alloy core sheets between the upper and lower sheets, and applying release agent layers between the pair of core sheets in a region corresponding to anti-icing duct, between the upper sheet and one of the core sheets in regions corresponding to hot air passages and between the lower sheet and other core sheet in regions corresponding to the hot air passages; a laminar structure setting step for setting the laminar structure in a mold having a forming surface of a shape corresponding to an external shape of the leading edge structure; a forming step for forming a structure having an outer skin, a front wall and ribs by joining together parts of the superposed sheets corresponding to regions not applied with the release agent layers by diffusion bonding or welding, heating the laminar structure, supplying a superplastic forming gas into spaces between parts of the superposed sheets corresponding to regions applied with the release agent layers to subject the same parts of the superposed sheets to superplastic deformation and to press the upper and lower sheets against the forming surface of the forming mold; and a trimming step for trimming the structure to complete the leading edge structure.

The leading edge structure comprising the outer skin, the anti-icing duct, the hot air passage and the ribs is thus constructed by properly superposing the core sheets, the upper and the lower sheet with the release agent layers applied in the appropriate regions between the sheets, properly joining together the sheets by diffusion bonding or welding and shaping the sheets by superplastic forming. Accordingly, component members which are necessary for forming the prior art leading edge structure including ribs and the like respectively having different shapes need not be individually fabricated, assembling work for assembling the component members is unnecessary, and many of jigs which are necessary for fabricating the prior art leading edge structure can be omitted.

In the method of fabricating a leading edge structure according to the second aspect of the present invention, the mold may have a first half mold having a forming surface of a shape corresponding to that of an upper section of the outer skin of the leading edge structure, and a second half mold having a forming surface of a shape corresponding to that of a lower section of the outer skin of the leading edge structure, the laminar structure may be disposed between the first and the second half mold in the laminar structure setting step, and the upper and the lower sheet may be pressed against the forming surface of the first half mold and the forming surface of the second half mold, respectively, in the forming step.

In the method of fabricating a leading edge structure according to the present invention, through holes may be formed in parts of the core sheets corresponding to the regions in which the release agent layers are applied to achieve efficient supply of the superplastic forming gas into spaces between corresponding parts of the superposed sheets applied with the release agent layers.

In the method of fabricating a leading edge structure of an aircraft airfoil according to the present invention, the through holes may be formed so that the holes serve as air jetting openings formed in the front wall after the superplastic forming gas has been supplied into spaces between corresponding parts of the superposed sheets applied with the release agent layers to subject the same parts of the superposed sheets to superplastic deformation, and the upper sheet and the lower sheet have been pressed against the forming surfaces of the first and the second half mold, respectively. Thus, boring work for forming holes in the front wall can be omitted and thereby the work for fabricating the leading edge structure can be simplified.

The above and other objects, features and advantages of the present invention will become understood from the following description taken in connection with the accompanying drawings.

BRIEF DESCRIPTION OF THE DRAWINGS

FIG. 2 is a sectional view taken on line II—II in FIG. 1;

FIG. 3 is a sectional view taken on line III—III in FIG. 1;

FIGS. 4A, 4B, 4C, 4D and 4E are views explaining a method of fabricating the leading edge structure of FIG. 1;

DESCRIPTION OF THE PREFERRED EMBODIMENTS

Figure 1:
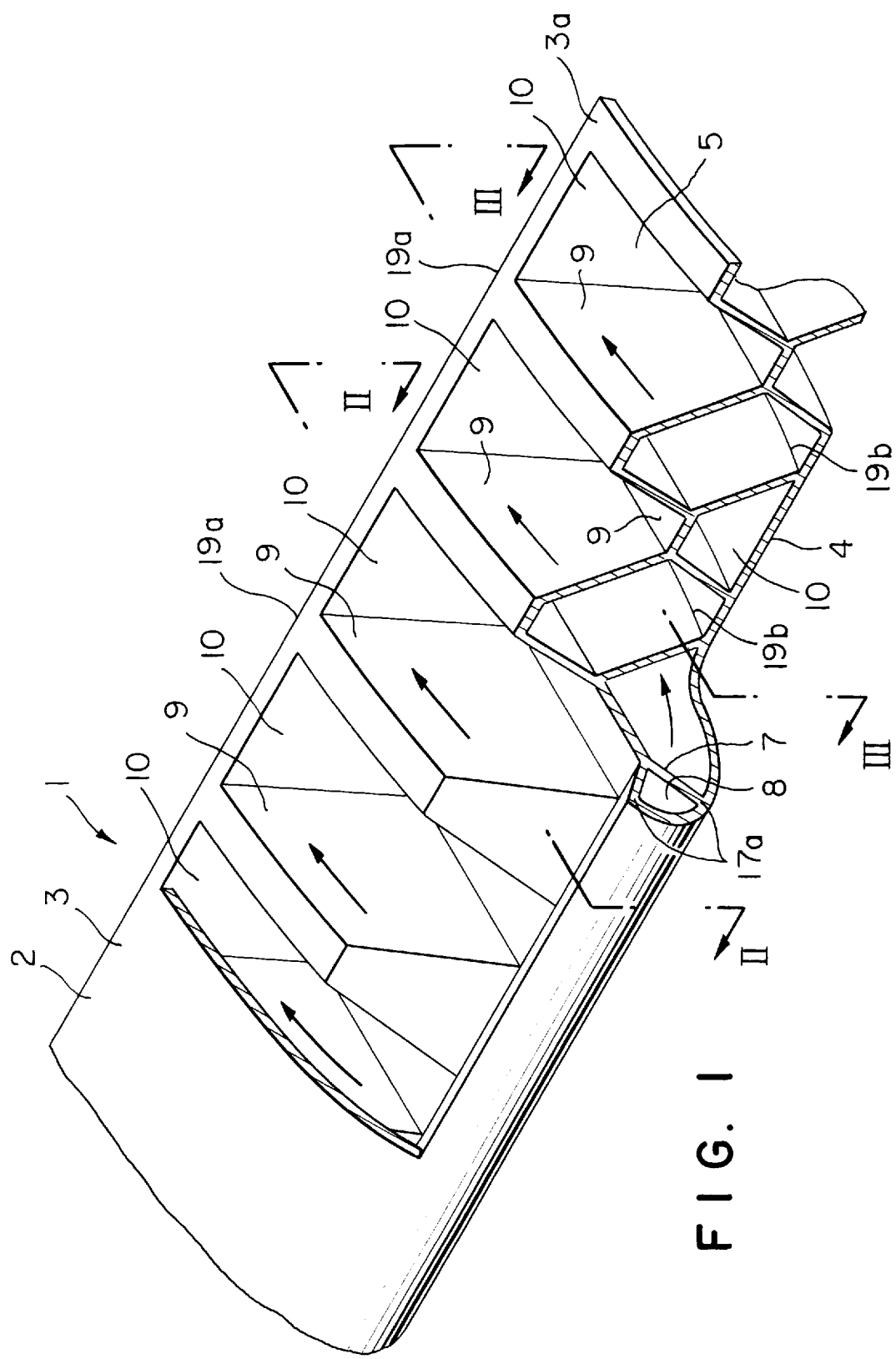
FIG. 1 is a partially cutaway perspective view of a leading edge structure for an airfoil in a preferred embodiment according to the present invention.

Referring to FIGS. 1, 2 and 3 showing a leading edge structure 1 according to a preferred embodiment of the present invention for an aircraft wing or the like, the leading edge structure 1 has an ice formation preventing means wherein a high temperature air from an engine compressor is guided into the interior space of the leading edge structure enclosed by an outer skin 2 so as to flow along the inner surface of the outer skin 2 to raise the surface temperature of the skin 2 in order that the ice formation on the surface of the leading edge structure 1 is prevented.

The leading edge structure members 1 are made of a superplastic titanium alloy, such as Ti-6Al-4V. The outer skin 2 has a substantially U-shaped cross section and integrally consists of an upper section 3 and a lower section 4. A rear wall 5 extends between a rear edge 3a of the upper section 3 and a rear edge 4a of the lower section 4. The outer skin 2 and the rear wall 5 define a hot air chamber 6. A front wall 7 formed integrally with the outer skin 2 extends along the length of the leading edge structure 1 to form an anti-icing duct 8 in a front section of the hot air chamber 6 together with a front end part of the outer skin 2.

Honeycomb ribs 9 having a polygonal cross section are formed between the upper section 3 and the lower section 4 of the outer skin 2 so as to extend between the front wall 7 and the rear wall 5 to form a plurality of hot air passages 10 extending in the direction of the width of the wing. The front wall 7 separating the anti-icing duct 8 from the hot air passages 10 is provided with a plurality of air jetting holes 7a to eject hot air from the anti-icing duct 8 into the hot air passages 10.

Superplastic forming is used to form the component members of the leading edge structure 1 including the upper section 3 of the outer skin 2, the lower section 4 of the outer skin 2, the rear wall 5, the front wall 7 and the ribs 9 defining the hot air chamber 6, the anti-icing duct 8 and the hot air passages 10. For the fabrication of the leading edge structure 1, diffusion bonding is used to form the joint 12a of the sections 3 and 4 of the outer skin 2, the joint 15a of the rear edge 3a of the upper section 3 of the outer skin 2 and the rear wall 5, the joint 15a of the rear edge 4a of the lower section 4 of the outer skin 2, the joint 17a of the upper section 3 of the outer skin 2 and the front wall 7, the joint 17a of the lower section 4 of the outer skin 2, the joints 19a of the upper section 3 of the outer skin 2 and the ribs 9, and the joints 19b of the lower section 4 of the outer skin and the ribs 9.

High temperature air supplied into the anti-icing duct 8 is supplied through the air jetting holes 7a formed in the front wall 7 into the hot air passages 10 defined by the upper section 3 of the outer skin 2 and the ribs 9, and into the hot air passages 10 defined by the lower section 4 of the outer skin 2 and the ribs 9. Then the hot bleed air flows along the inner surfaces of the upper section 3 and the lower section 4 of the outer skin 2 and is discharged through air outlet holes 5a formed in the rear wall 5 and through a discharge hole formed in the tip of the wing into the atmosphere. The hot air supplied into the anti-icing duct 8 and flowing along the inner surfaces of the upper section 3 and the lower section 4 of the outer skin 2 raises the surface temperature of the outer skin 2 to prevent the ice formation on the front surface of the wing.

A method of fabricating the leading edge structure 1 will be described with reference to FIGS. 4A to 4E. Preparation is made of four superplastic titanium alloy sheets of, for example, Ti-6Al-4V, i.e., a pair of core sheets 21 and 22 for forming the anti-icing duct 8, the ribs 9 and the rear wall 5, an upper sheet 23 for forming the upper section 3 of the outer skin 2 and a lower sheet 24 for forming the lower section 4 of the outer skin 2. The sheets 21, 22, 23 and 24 have sizes sufficient to form the two leading edge structures 1 for the right and the left wing simultaneously and symmetrically in a united structure. The two leading edge structures 1 are formed in the united structure and the united structure is divided into the two leading edge structures 1.

Referring to FIG. 4B, a forming device 40 employed in fabricating the leading edge structure 1 is provided with a mold having a first half mold 41 and a second half mold 42. The first half mold 41 and the second half mold 42 have generally concave forming surfaces 41a and 42a, respectively. The first half mold 41 and the second half mold 42 are disposed with the respective forming surfaces 41a and 42a thereof facing each other. The forming surface 41a of the first half mold 41 corresponds to the upper surface of a united structure formed by bonding together the rear edges 3a of the upper sections 3 of the pair of leading edge structures 1 for a wing and by bonding together the rear edges 4a of the lower sections 4 of the same pair of leading edge structures 1. The forming surface 42a of the second half mold 42 corresponds to the lower surface of the same united structure. When the first half mold 41 and the second half mold 42 are pressed against a laminar structure formed by superposing the core sheets 21 and 22, the upper sheet 23 and the lower sheet 24 as shown in FIG. 4B, the forming surfaces 41a and 42a form a closed surface of a shape corresponding to the external shape of the united structure.

Figure 5:
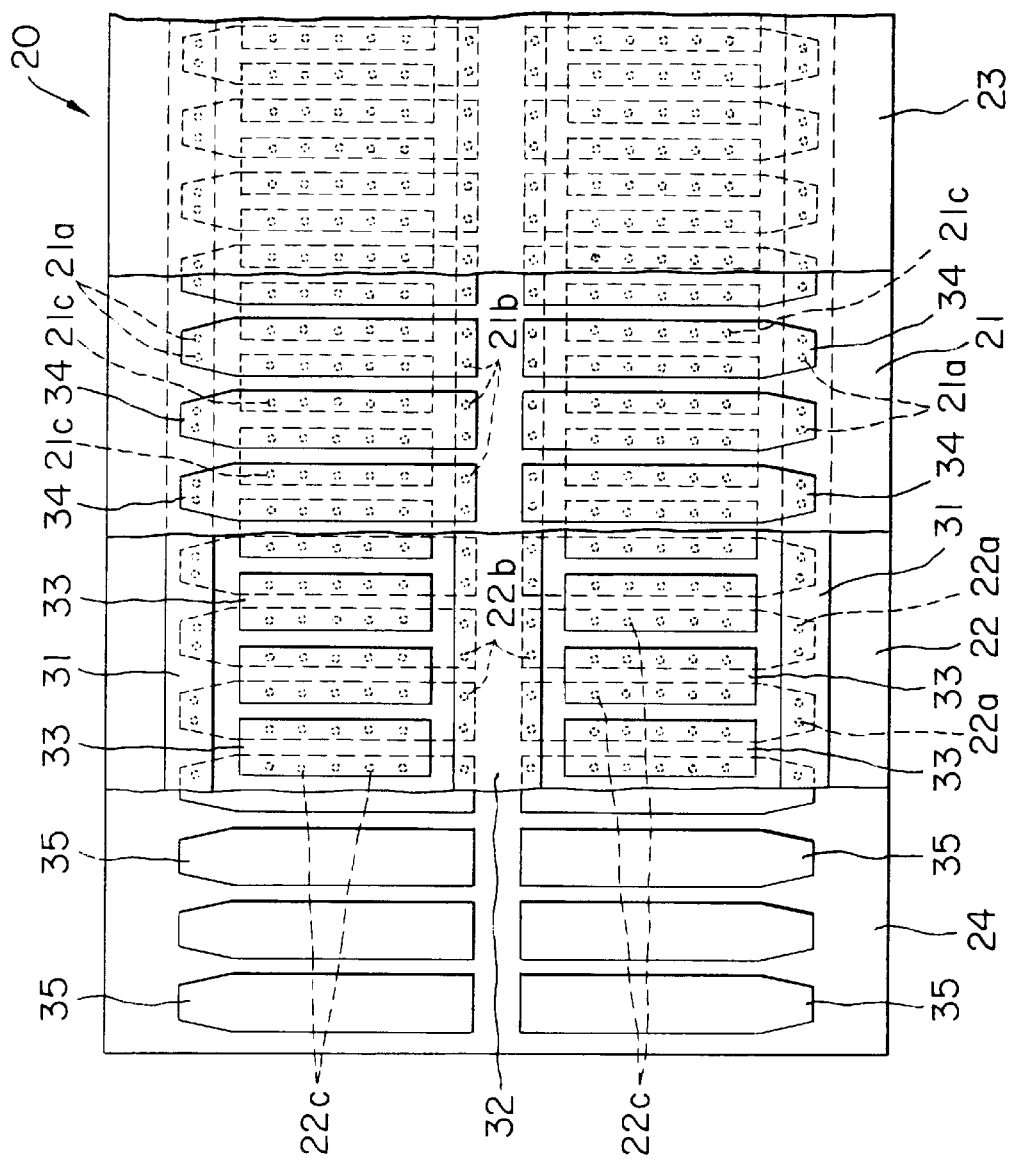
FIG. 5 is a plan view of a laminar structure explaining the superposition of the component sheets of the leading edge structure of FIG. 1 and the formation of release agent layers.
Figure 6:
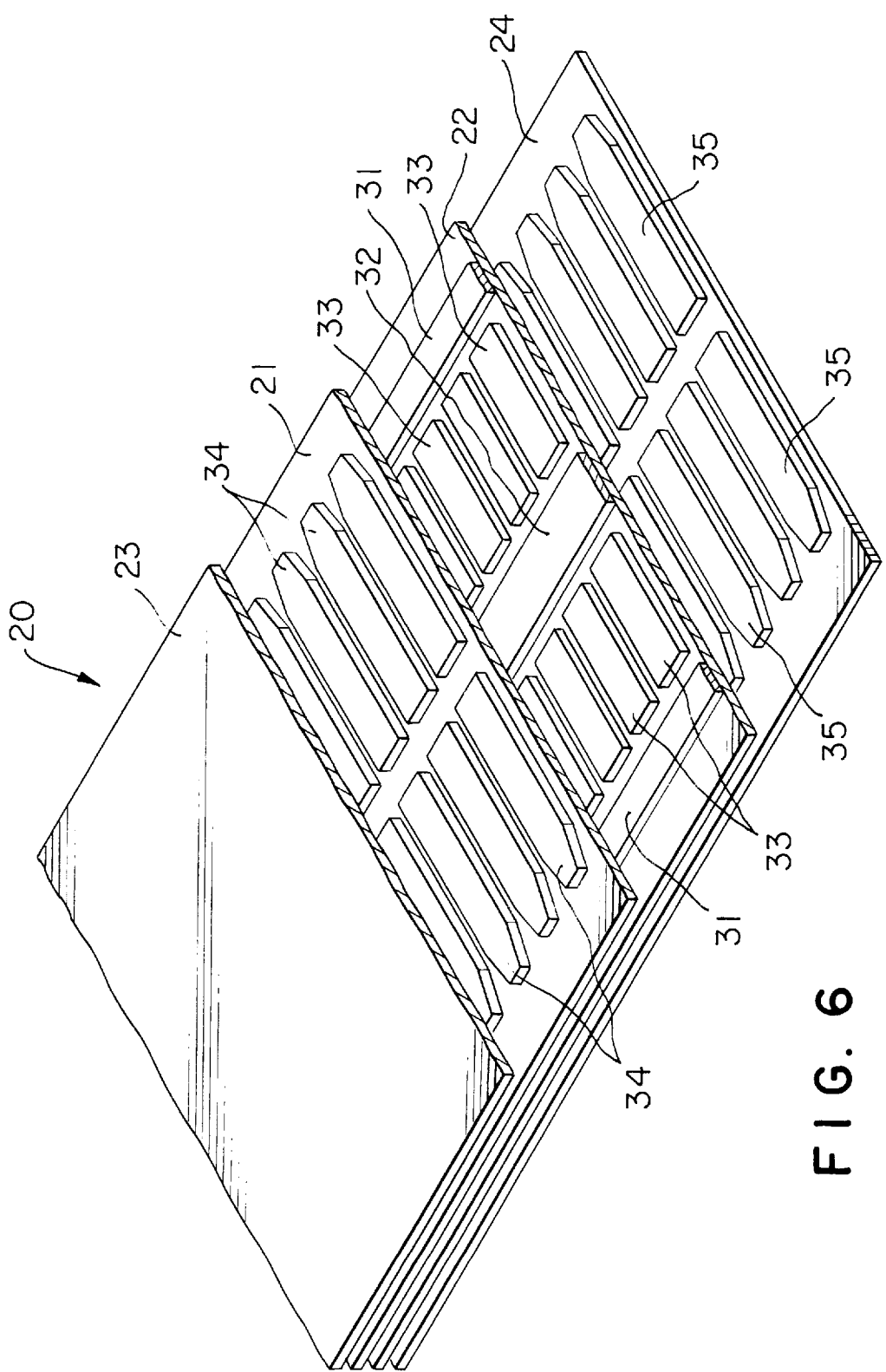
FIG. 6 is a fragmentary partly cutaway perspective view of the laminar structure of FIG. 5, explaining the superposition of the component sheets of the leading edge structure of FIG. 1 and the formation of the release agent layers.
Figure 7:
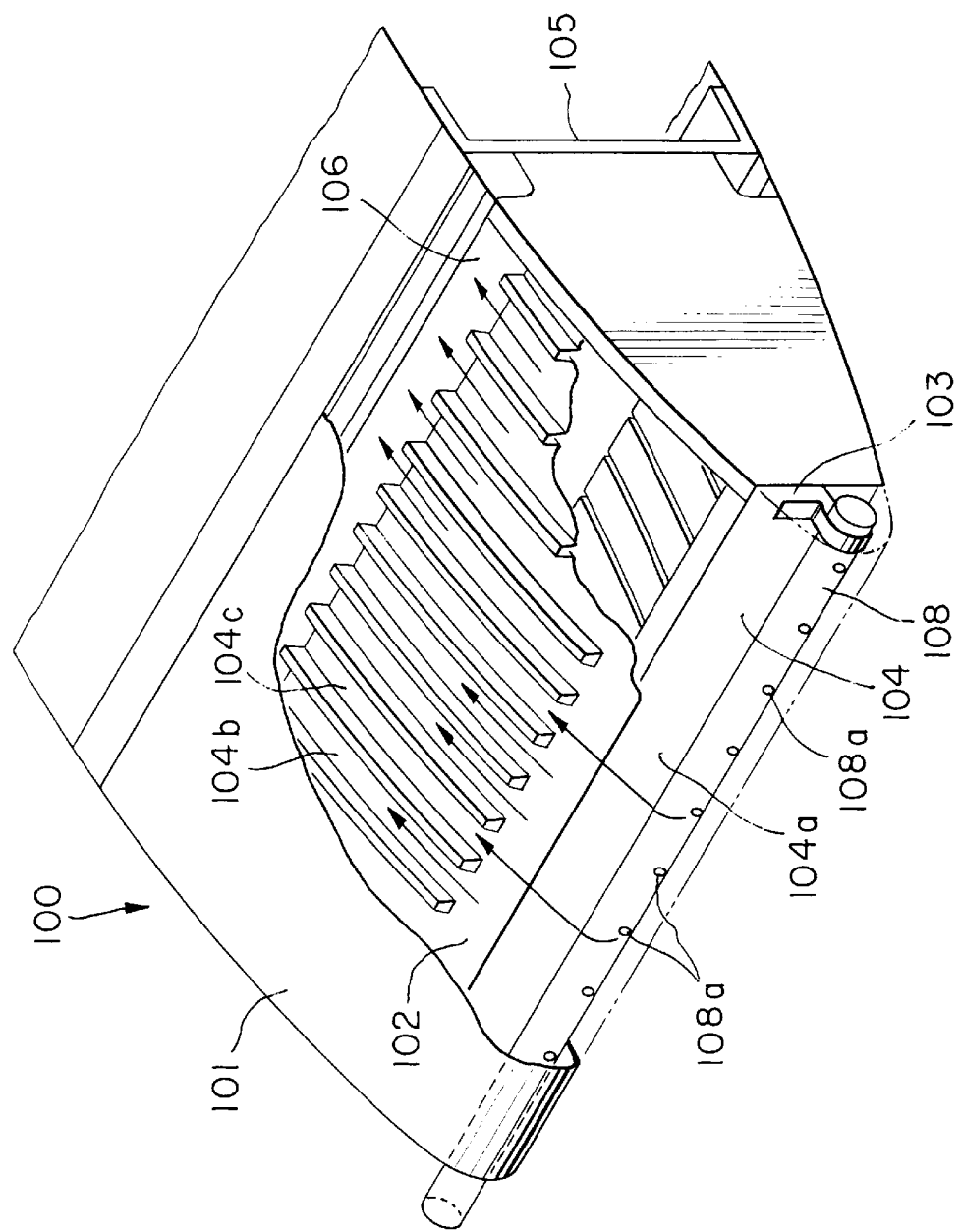
FIG. 7 is a fragmentary partly cutaway perspective view of a prior art leading edge structure of an aircraft airfoil.
Figure 8A:
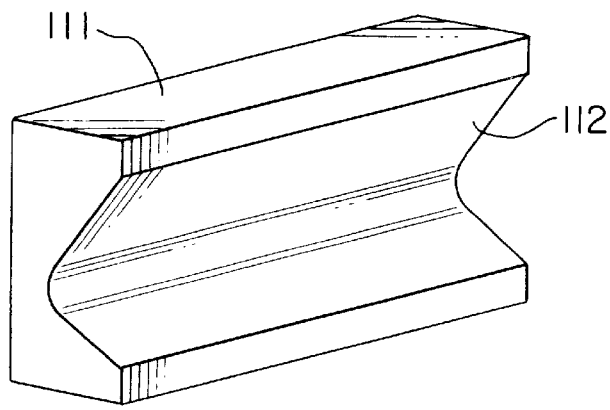
FIGS. 8A, 8B and 8C are perspective views showing a method of fabricating the prior art leading edge structure of FIG. 7.
Figure 8B:
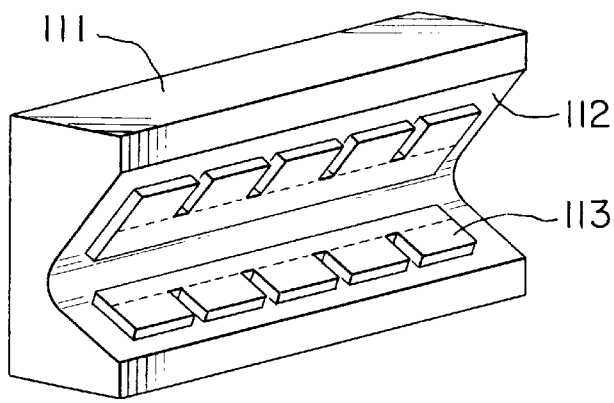
Figure 8C:
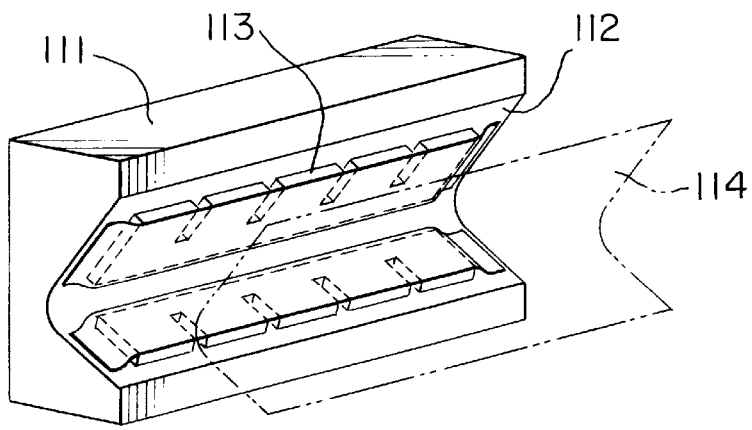
Figure 9:
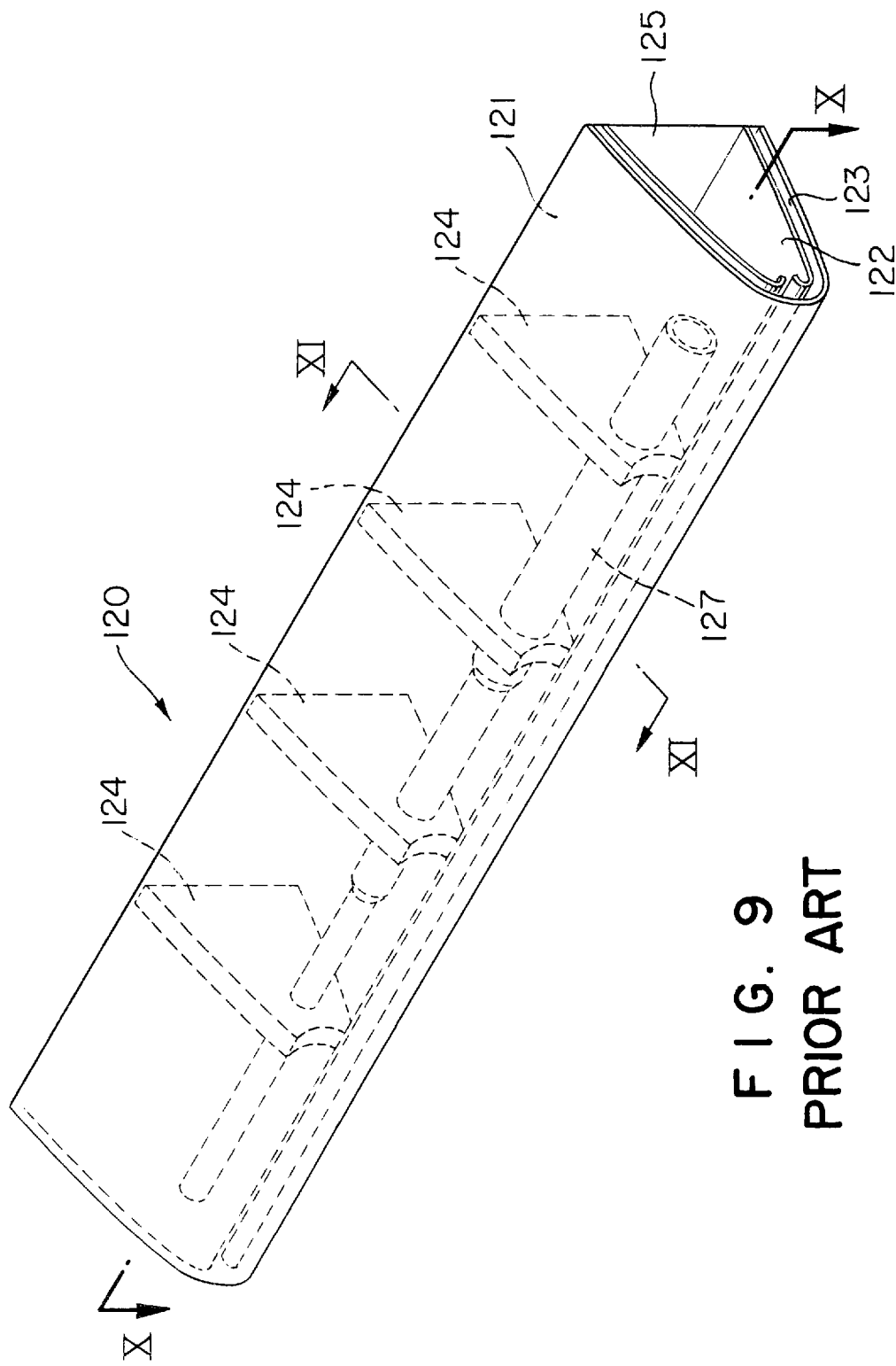
FIG. 9 is perspective view of another prior art leading edge structure.
Figure 10:
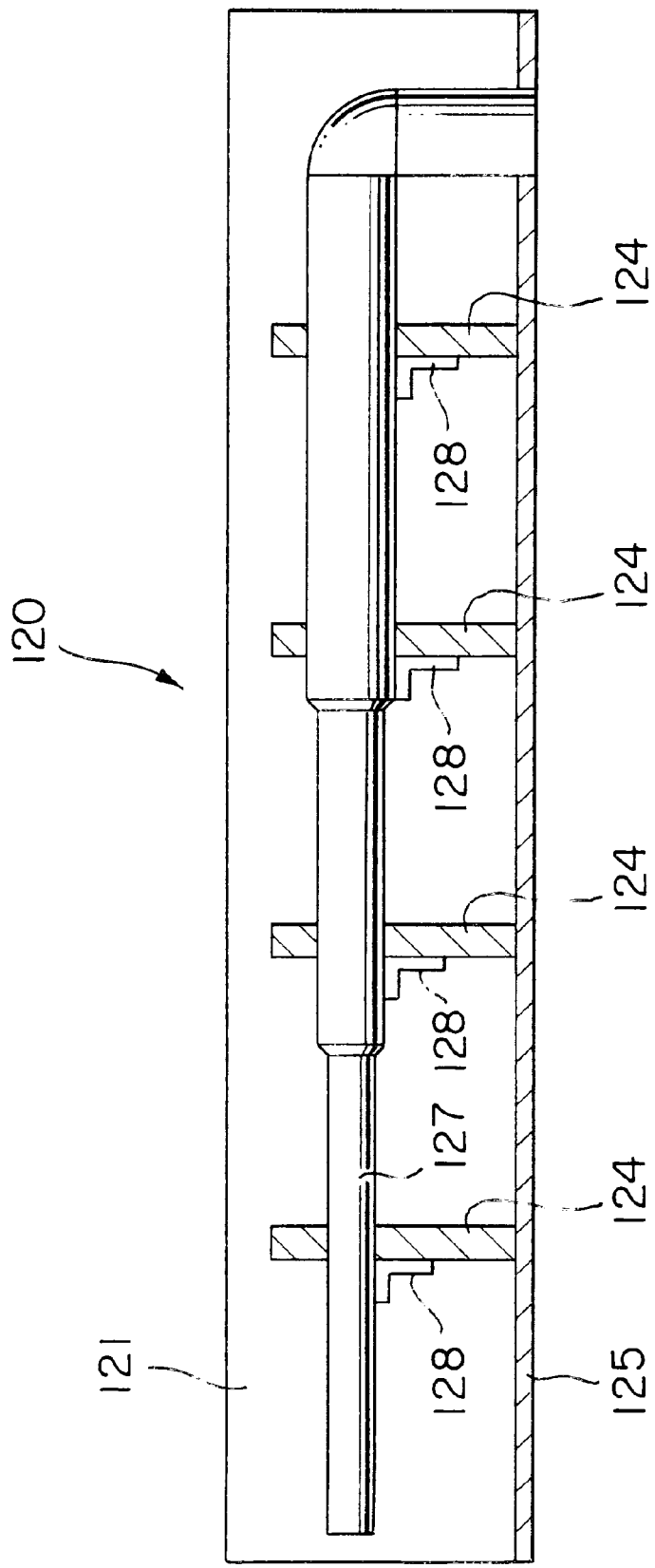
FIG. 10 is a sectional view taken on line X—X in FIG. 9.
Figure 11:
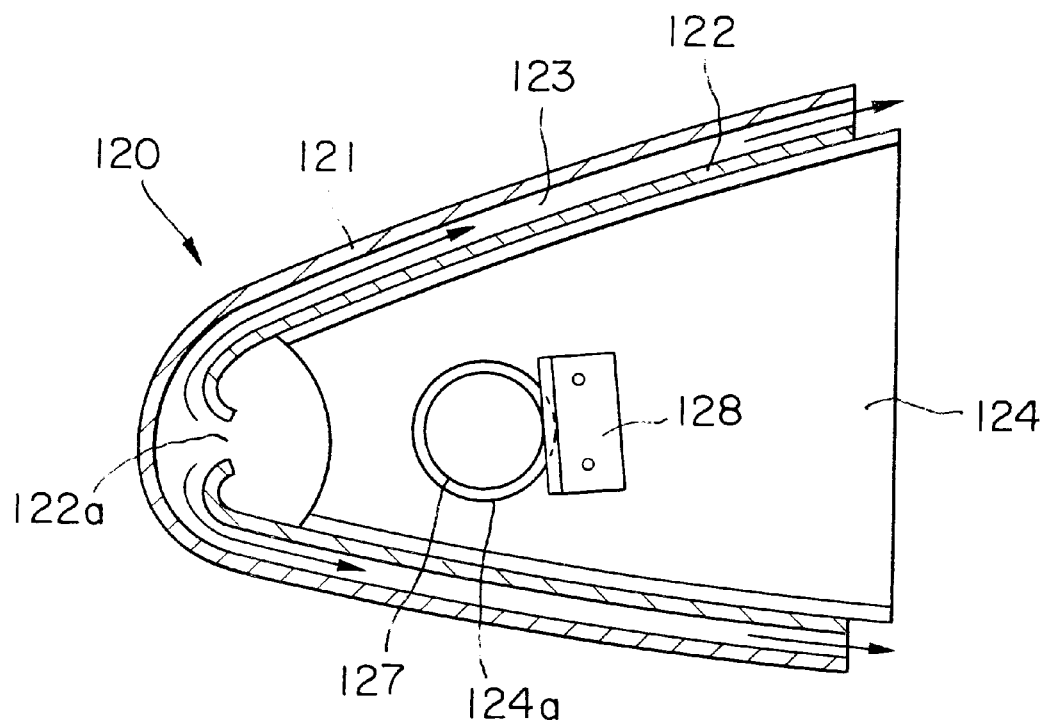
FIG. 11 is a sectional view taken on line X1—X1 in FIG. 9.
Figure 12:
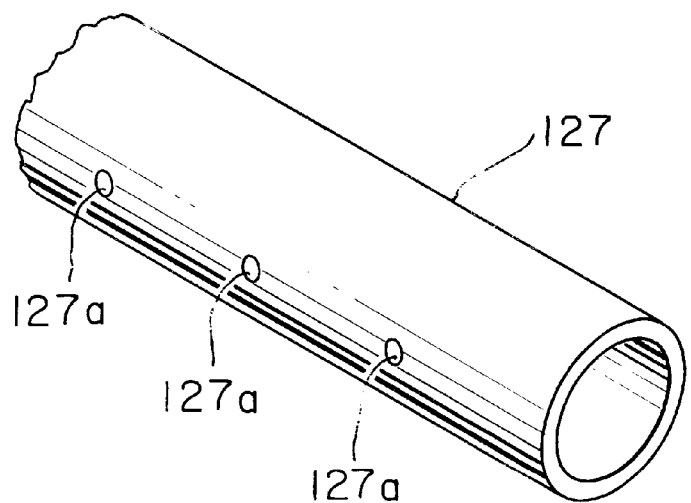
FIG. 12 is a fragmentary perspective view of an anti-icing duct included in the leading edge structure of FIG. 9.

In a superposing process S1 shown in FIG. 4A, elongate longitudinal release agent layers 31 of a predetermined width are formed between the pair of core sheets 21 and 22 along the opposite end edges of the pair of core sheets 21 and 22 in regions corresponding to the anti-icing ducts 8 of the pair of leading edge structures 1 to be formed simultaneously. An elongate middle longitudinal release agent layer 32 of a predetermined width is formed between the pair of core sheets 21 and 22 in a region corresponding to the rear walls 5 of the rear leading edge structures 1. Further, as shown in FIGS. 5 and 6, a plurality of transverse release agent layers 33 are formed between the longitudinal release agent layers 31 and the middle longitudinal release agent layer 32. Transverse release agent layers 34 are formed between the core sheet 21 and the upper sheet 23 in regions excluding those corresponding to the joints 19a of the upper sections 3 of the outer skins 2 and the ribs 9, i.e., in regions corresponding to the hot air passages 10. The transverse release agent layers 34 formed between the core sheet 21 and the upper sheet 23 in regions corresponding to the hot air passages 10 partly overlap the release agent layers 31, 32 and 33 formed between the core sheets 21 and 22 as shown in FIG. 5.

As indicated in FIG. 5, many through holes 21a, which serve as the air jetting holes 7a, are formed in the core sheet 21 at positions in regions where the longitudinal release agent layers 31 and the transverse release agent layers 34 overlap each other. Through holes 21b, which serve as the air outlet holes 5a, are formed in the core sheet 21 at positions in regions where the middle longitudinal release agent layer 32 and the transverse release agent layers 34 overlap each other. Through holes 21c are formed in the core sheet 21 at positions in regions where the transverse release agent layers 33 and 34 overlap each other to enable a space between the upper sheet 23 and the core sheet 21 and a space between the core sheets 21 and 22 communicate with each other.

Transverse release agent layers 35 are formed between the core sheet 22 and the lower sheet 24 in regions excluding those corresponding to the joints 19b of the lower sections 4 of the outer skins 2 and the ribs 9, i.e., in regions corresponding to the hot air passages 10. The transverse release agent layers 35 formed between the core sheet 22 and the lower sheet 24 in regions corresponding to the hot air passages 10 partly overlap the release agent layers 31, 32 and 33 formed between the core sheets 21 and 22 as shown in FIG. 6.

Through holes 22a, which serve as the air jetting holes 7a, are formed in the core sheet 22 at positions in regions where the longitudinal release agent layers 31 and the transverse release agent layers 35 overlap each other. Through holes 22b, which serve as the air outlet holes 5a, are formed in the core sheet 22 at positions in regions where the middle longitudinal release agent layer 32 and the transverse release agent layers 35 overlap each other. Through holes 22c are formed in the core sheet 22 at positions in regions where the transverse release agent layers 33 and 35 overlap each other.

The core sheets 21 and 22, the upper sheet 23 and the lower sheet 24 provided with the release agent layers 31, 32, 33, 34 and 35 are superposed to construct a laminar structure 20 as shown in FIG. 4A and FIG. 6.

In a setting process S2 shown in FIG. 4B, the laminar structure 20 thus constructed in the superposing process S1 is positioned on the second half mold 42 of the forming device 40 as shown, and the laminar structure 20 is clamped between the first half mold 41 and the second half mold 42. The forming device 40 holding the laminar structure 20 between the first half mold 41 and the second half mold 42 is carried into a heating furnace, not shown.

In a forming process S3 shown in FIG. 4C, the forming device 40 and the laminar structure 20 are heated at a temperature in the range of about 900 to about 920° C. in the heating furnace, and then a superplastic forming gas, i.e., an inert gas, such as argon or helium gas, of a predetermined pressure is supplied through a gas inlet port, not shown, formed in the forming device 40 into a cavity 41A (FIG. 4B) defined by the forming surface 41a of the first half mold 41 and the laminar structure 20, and a cavity 42A defined by the forming surface 42a of the second half mold 42 and the laminar structure 20 to bond together corresponding parts not coated with the release agent layers of the core sheets 21 and 22, corresponding parts not coated with the release agent layers of the core sheet 21 and the upper sheet 23, and corresponding parts not coated with the release agent layers of the core sheet 22 and the lower 15 sheet 24, by diffusion bonding.

Subsequently, the cavities 41A and 42A are evacuated, and then a superplastic forming gas of a pressure in the range of 10 to 30 kgf/cm$^2$ is forced into spaces between parts of the core sheets 21 and 22 corresponding to the longitudinal release agent layers 31. Consequently, the parts of the core sheets 21 and 22 corresponding to the release agent layers 31, i.e., parts of the core sheets 21 and 22 for forming the anti-icing ducts 8, are subjected to superplastic deformation. The superplastic forming gas further flows through the through holes 21a and 22a of the core sheets 21 and 22 into spaces between parts of the core sheet 21 and the upper sheet 23 corresponding to the transverse release agent layers 34 and into spaces between parts of the core sheet 22 and the lower sheet 24 corresponding to the transverse release agent layers 35. Consequently, the parts of the core sheets 21 and 22, the upper sheet 23 and the lower sheet 24 corresponding to the transverse release agent layers 34 and 35, i.e., parts mainly for forming the hot air passages 10, are subjected to superplastic deformation. The superplastic forming gas flows also through the through holes 21c and 22c into space between parts of the core sheets 21 and 22 corresponding to the transverse release agent layers 33. Consequently, the parts of the core sheets 21 and 22 are subjected to superplastic deformation to form mainly the ribs 9.

Similarly, the superplastic forming gas flows through the through holes 21b and 22b into spaces between parts of the core sheets 21 and 22 corresponding to the middle longitudinal release agent layer 32, so that the same parts of the core sheets 21 and 22 are subjected to superplastic deformation to form the rear walls 5. Thus the parts of the core sheets 21 and 22, the upper sheet 23 and the lower sheet 24 corresponding to the release agent layers 31, 32, 33, 34 and 35 are subjected to the superplastic deforming action of the superplastic forming gas.

The superplastic forming gas is supplied continuously until the upper sheet 23 is pressed perfectly against the forming surface 41a of the first half mold 41, and the lower sheet 24 is pressed perfectly against the forming surface 42a of the second half mold 42 as shown in FIG. 4C to complete a united structure 25.

In a removing process S4 shown in FIG. 4D, the united structure 25 is removed from the forming device 40.

In a trimming process S5 shown in FIG. 4E, flanges 25a projecting from the periphery of the united structure 25 are removed, the united structure 25 is divided along the center axis into a pair of symmetrical structures, and the symmetrical structures are trimmed by grinding or the like to finish a pair of leading edge structures 1 respectively for the right and the left wing as shown in FIGS. 1, 2 and 3.

In the leading edge structure 1 thus constructed, the outer skin 2 and the rear wall 5 define the hot air chamber 6, a front section of the hot air chamber 6 is closed by the front wall 7 to form the longitudinal anti-icing duct 8, the ribs 9 extend between the upper section 3 and the lower section 4 of the outer skin 2 from the front wall 7 to the rear wall 5. Since the component sheets 21, 22, 23 and 24 are united in an integral unit by diffusion bonding, the leading edge structure 1 has a high strength.

The leading edge structure 1 having the anti-icing duct 8, the ribs 9 and the hot air passages 10 is formed by constructing the laminar structure 20 by superposing the core sheets 21 and 22, the upper sheet 23 and the lower sheet 24, by forming the release agent layers 31, 32, 33, 34 and 35 in appropriate regions between the core sheets 21 and 22, the upper sheet 23 and the lower sheet 24, and by subjecting the laminar structure 20 to the diffusion bonding process and the superplastic forming process. Accordingly, many component members with different shapes such as ribs as those of the prior art need not be individually fabricated, assembling work for assembling the component members is unnecessary, and many of jigs which are necessary for fabricating the prior art leading edge structure can be omitted. Since the through holes 21a and 22a used in the superplastic forming process serve as the air jetting holes 7a, the boring work for forming holes in the wall of the anti-icing duct 8 is unnecessary, which simplifies the work for fabricating the leading edge structure 1.

The parts of the core sheets 21 and 22, the upper sheet 23 and the lower sheet 24 to be bonded together may be bonded by welding instead of diffusion bonding. A liquid-interface diffusion bonding, which forms an insert layer, such as a Cu-Ni plated layer, between necessary portions of the sheets to be bonded together, may be employed in bonding the portions of the core sheets 21 and 22, the upper sheet 23 and the lower sheet 24 to be bonded together.

If sheets of a titanium alloy other than the titanium alloy Ti-6Al-4V are used, the pressure of the superplastic forming gas and the temperature at which the sheets are to be heated are changed properly. The laminar structure may be provided with additional core sheets to form ribs different from those of the foregoing embodiment and necessary for forming a leading edge structure of a required strength. Sheets of a release agent may be used instead of the release agent layers.

As is apparent from the foregoing description, in the leading edge structure according to the present invention, a front section of the internal space defined by the outer skin and the rear wall is closed by the front wall to form the anti-icing duct, and the ribs are formed between the upper and the lower section of the outer skin to form the hot air passages through which hot air flows along the inner surfaces of the outer skin. Further, parts not coated with the release agent layers of the component members of a superplastic titanium alloy of the leading edge structure including the outer skin, the front wall and the ribs are bonded together by diffusion bonding or welding, and parts coated with the release agent layers of the component members are formed in desired shapes by the superplastic forming process to form the leading edge structure. Therefore, the leading edge structure has a high strength, any work for attaching an anti-icing duct to the leading edge structure is unnecessary and work for fabricating the leading edge structure is simplified.

The method of fabricating the leading edge structure for an aircraft airfoil of the present invention forms the leading edge structure integrally provided with the anti-icing duct, the hot air passages and the ribs by constructing the laminar structure by superposing the core sheets, the upper sheet and the lower sheet and forming the release agent layers in appropriate regions between the sheets, bonding together the predetermined parts of the sheets by diffusion bonding or welding, and deforming the parts corresponding to the release agent layers of the sheets by superplastic forming. Therefore, many component members, such as ribs, of different shapes, and many of the jigs necessary for making and assembling the component members can be omitted.

Since the spaces between the parts of the sheets corresponding to the release agent layers communicate with each other by means of the through holes formed in the core sheets, the superplastic forming gas can be efficiently supplied into the spaces between the parts of the sheets to be deformed.

Since the through holes used in the superplastic forming process to supply the superplastic forming gas into the spaces between the parts of the sheets corresponding to the release agent layers serve as the air jetting holes, boring work for forming holes in the front wall defining the anti-icing duct is unnecessary, which simplifies the work for fabricating the leading edge structure.

While the presently preferred embodiments of the present invention have been shown and described, it is to be understood that these disclosures are for the purpose of illustration and that various changes and modifications may be made without departing from the scope of the invention as set forth in the appended claims.

What is claim is:

1. A leading edge structure of an airfoil comprising:
    an outer skin continuously and integrally formed of upper and lower sections;
    a front wall extending in a spanwise direction of the leading edge structure in a front section of the outer skin and forming an air duct with said outer skin for passing hot air;
    an air hole provided through said front wall; and a plurality of ribs disposed between the upper and lower sections of the outer skin so as to form a hot air passage for hot air supplied through the air hole of the front wall.

2. The leading edge structure according to claim 1, further comprising:

a rear wall attached to rear edges of the upper and lower sections of the outer skin to define a space together with the outer skin.

3. The leading edge structure according to claim 1, wherein:

said hot air passage is disposed in pairs of an upper hot air passage and a lower hot air passage.

4. A leading edge structure of an airfoil comprising:

an outer skin formed of upper and lower sections;

a plurality of ribs extending in a width direction of the leading edge structure and formed together with said upper and lower sections for forming a plurality of first spaces;

a front wall extending in a spanwise direction of the leading edge structure in a front section of the outer skin and connecting with said outer skin and said plurality of ribs for forming a second space;

a rear wall extending in a spanwise direction of the leading edge structure in a front section of the outer skin and connecting with said outer skin;

an air duct formed by said second space for supplying hot air;

an air passage formed by said first spaces for heating surface temperature of said outer skin by passing said hot air therethrough;

an air inlet hole provided in said front wall for ejecting said hot air from said air duct into said air passage; and an air outlet hole provided in said rear wall for discharging said hot air from said air passage to outside.

5. The leading edge structure according to claim 4, wherein said air inlet hole is formed in pairs of an upper hole for ejecting said hot air to a direction of said upper section and a lower hole for ejecting said hot air to a direction of said lower section.

6. The leading edge structure according to claim 5, wherein said air passage is formed in pairs of an upper passage for heating a temperature of said upper section by said hot air ejected from said upper hole and a lower passage for heating a temperature of said lower section by said hot air ejected from said lower hole.

7. The leading edge structure according to claim 6, wherein said air outlet hole is formed in pairs of an upper outlet hole for discharging said hot air from said upper passage to outside, and a lower outlet hole for discharging said hot air from said lower passage to outside.

* * * * *